(12) United States Patent
Isaka et al.

(10) Patent No.: US 7,267,764 B2
(45) Date of Patent: Sep. 11, 2007

(54) APPARATUS FOR REMOVING NITROGEN

(75) Inventors: Kazuichi Isaka, Tokyo (JP); Tatsuo Sumino, Tokyo (JP)

(73) Assignee: Hitachi Plant Engineering & Construction Co., Ltd., Tokyo (JP)

( * ) Notice: Subject to any disclaimer, the term of this patent is extended or adjusted under 35 U.S.C. 154(b) by 73 days.

(21) Appl. No.: 11/416,109

(22) Filed: May 3, 2006

(65) Prior Publication Data

US 2006/0196815 A1     Sep. 7, 2006

Related U.S. Application Data

(62) Division of application No. 11/086,242, filed on Mar. 23, 2005.

(30) Foreign Application Priority Data

Mar. 25, 2004 (JP) .............................. 2004-090239
Jun. 18, 2004 (JP) .............................. 2004-181541

(51) Int. Cl.
    *C02F 3/00* (2006.01)
(52) U.S. Cl. ..................... 210/194; 210/220; 210/630
(58) Field of Classification Search ................ 210/194, 210/220, 630
    See application file for complete search history.

(56) References Cited

U.S. PATENT DOCUMENTS

| | | |
|---|---|---|
| 4,183,809 A | 1/1980 | Klapwijk et al. |
| 5,259,959 A | 11/1993 | Mulder |
| 2002/0074287 A1 | 6/2002 | Park et al. |

FOREIGN PATENT DOCUMENTS

| | | |
|---|---|---|
| EP | 0 019 203 A1 | 11/1980 |
| EP | 0 839 766 A2 | 5/1998 |
| JP | A 2001-037467 | 2/2001 |
| WO | WO 03/065798 A1 | 8/2003 |

OTHER PUBLICATIONS

Strous, Marc et al., "Ammonium Removal From Concentrated Waste Streams With The Anaerobic Ammonium Oxidation (Anammox) Process In Different Reactor Configurations" Water Research, *Pergamon Press*, Oxford, Great Britain, vol. 31, No. 8, Aug. 1997, pp. 1955-1962, XP00487763, ISSN: 0043-1354.

*Primary Examiner*—Chester T. Barry
(74) *Attorney, Agent, or Firm*—Oliff & Berridge, PLC

(57) ABSTRACT

An apparatus for removing nitrogen is provided herein. In the apparatus, the nitrogen is removed from wastewater containing a BOD component and ammonium nitrogen by anaerobic ammonium oxidation. The apparatus includes a distributor, which distributes the wastewater into two portions; a nitrification vessel which connects to a first portion of said two portions, in which ammonia contained in wastewater distributed to the first portion is nitrified by ammonium oxidizing bacteria; a denitrification vessel which connects to a second portion of said two portions, in which wastewater distributed to the second portion is denitrified by denitrification bacteria; an anaerobic ammonium oxidation vessel, in which mixed water of first treated water from the nitrification vessel and second treated water from the denitrification vessel is subjected to anaerobic ammonium oxidation by ammonium oxidizing bacteria; and a returning line which feeds back a third treated water from the anaerobic ammonium oxidation vessel to the denitrification vessel for denitrification and BOD decomposition.

8 Claims, 4 Drawing Sheets

APPARATUS FOR REMOVING NITROGEN

This is a Divisional Application of U.S. patent application Ser. No. 11/086,242 filed Mar. 23, 2005. The entire disclosure of the prior application is hereby incorporated by reference herein in its entirety.

BACKGROUND OF THE INVENTION

1. Field of the Invention

The present invention relates to a method and apparatus of removing nitrogen, and more particularly, to a method and apparatus of removing nitrogen, in which ammonium nitrogen is removed from wastewater containing a BOD component and ammonium nitrogen by anaerobic ammonium oxidation.

2. Description of the Related Art

Nitrogen components contained in sewage and industrial effluent cause eutrophication in lakes and lower the level of dissolved oxygen in rivers. For these reasons, they must be removed. Examples of nitrogen components contained in the sewage and industrial effluent primarily include ammonium nitrogen, nitrite nitrogen, nitrate nitrogen, and organic nitrogen.

Conventionally, when the concentration of nitrogen in such wastewater is low, an ion exchange method and oxidation with chloride or ozone are used to remove nitrogen. When the concentration of nitrogen is medium or high, biological treatment is employed and usually operated in the following conditions.

In the biological treatment, nitrification/denitrification treatment is performed by both aerobic nitrification and anaerobic denitrification. In the aerobic nitrification, ammonium nitrogen and nitrite nitrogen are oxidized by ammonium oxidation bacteria (*Nitrosomonas, Nitrosococcus, Nitrosospira, Nitrosolobus*, etc.) and nitrite oxidation bacteria (*Nitrobactor, Nitrospina, Nitrococcus, Nitrospira* etc.). Whereas, in the anaerobic denitrification, denitrification is performed by heterotrophic bacteria (*Pseudomonas denitrificans* etc.).

Furthermore, a nitrification vessel for aerobic nitrification is operated under a load of 0.2 to 0.3 kg-N/m$^3$/day, whereas a denitrification vessel for anaerobic denitrification is operated under a load of 0.2 to 0.4 kg-N/M$^3$ per day. To treat nitrogen contained in a total concentration of 30 to 40 mg/L in sewage, the sewage must be retained in a nitrification vessel for 6 to 8 hours and in a denitrification vessel for 5 to 8 hours. To attain these treatments, a large treatment vessel is required. Furthermore, the nitrification vessel and denitrification vessel for use in treating industrial effluent containing only inorganic components are designed to treat the same loads as above. However, this case requires an organic material for denitrification, so that methanol is usually added in a concentration three or four times as large as a nitrogen concentration. Therefore, this case has a problem in that not only initial cost but also large running cost is required.

However, recently, anaerobic ammonium oxidation which is a method of removing nitrogen from wastewater has been remarkable as effective and economical nitrogen removal method (for example, Japanese Patent Application Laid Open No. 2001-37467). In the anaerobic ammonium oxidation, ammonium and nitrite are simultaneously removed by anaerobic ammonium oxidizing bacteria in accordance with the following reaction scheme:

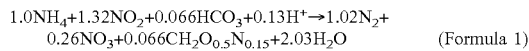
(Formula 1)

This method has the following advantages. Since ammonium is used as a hydrogen donor, the amount of methanol to be used for denitrification can be significantly reduced and the amount of excess sludge can be decreased.

SUMMARY OF THE INVENTION

However, to realize a nitrogen removing apparatus using such anaerobic ammonium oxidation for practical use, the following problems must be solved.

(1) Control of the ratio of ammonium ($NH_4$) to nitrite ($NO_2$) (hereinafter referred to as a "first problem")

In the anaerobic ammonium oxidation, ammonium contained in wastewater is partly oxidized to nitrite and then, ammonia and the nitrite are simultaneously denitrified by anaerobic ammonia oxidation bacteria. Therefore, to efficiently perform anaerobic ammonium oxidation, the ratio of ammonium nitrogen to nitrite nitrogen must be set to be nearly 1:1.32, as is apparent from the stoichiometry of reaction. However, it is difficult to accurately control the ratio closer to this value. It has been propose a method of controlling the ratio of ammonium nitrogen to nitrite nitrogen, for example, by controlling a nitrification rate when the whole amount of wastewater is treated. However, this method has a difficult problem because the nitrification rate may greatly vary depending upon ammonium concentration of wastewater.

(2) Inhibition of anaerobic ammonium oxidation method by BOD component (hereinafter referred to as a "second problem")

It is known that the efficiency of anaerobic ammonium oxidation decreases due to inhibition by a BOD component. More specifically, when a BOD component is present, not an anaerobic ammonium oxidation reaction but a general denitrification reaction takes place, and proliferation of anaerobic ammonium oxidation bacteria responsible for anaerobic ammonium oxidation is inhibited.

(3) Remaining nitrate in treated water by anaerobic ammonium oxidation method (hereinafter referred to as a "third problem")

As is apparent from the stoichometry, since 0.26 mol of nitrate ($NO_3$) is generated per mol of ammonium in the anaerobic ammonium oxidation, and thus, nitrate is left in the treated water. Therefore, a treatment device for removing the nitrate must be arranged downstream of the anaerobic ammonium oxidation vessel. However, if such a treatment device is provided discretely, the whole nitrogen removing apparatus is enlarged.

The present invention was attained in view of these circumstances. The present invention can not only overcome the first to third problems but also improve the performance of anaerobic ammonium oxidation, and further directed to providing a method and apparatus of removing nitrogen without increasing the size of the apparatus.

According to a first aspect of the present invention, to attain the aforementioned object, there is provided a method of removing nitrogen, in which the nitrogen is removed from wastewater containing a BOD component and ammonium nitrogen by anaerobic ammonium oxidation, comprising the steps of:

distributing the wastewater into two portions which are a nitrification vessel and a denitrification vessel at a predetermined distribution ratio;

mixing first treated water which is nitrified by ammonium oxidizing bacteria from ammonia to nitrite in the nitrification vessel, with second treated water which is denitrified by denitrification bacteria in the denitrification vessel; and feeding the mixed water to an anaerobic ammonium oxidation vessel to simultaneously denitrify ammonia and nitrite by anaerobic ammonium oxidizing bacteria, thereby obtaining a third treated water treated in the anaerobic ammonium oxidation vessel, which is then fed back to the anaerobic denitrification vessel for denitrification and BOD decomposition.

According to a second aspect of the present invention, to attain the aforementioned object, there is provided an apparatus of removing nitrogen, in which the nitrogen is removed from wastewater containing a BOD component and ammonium nitrogen by anaerobic ammonium oxidation, comprising:

a distributor, which distributes the wastewater into two portions;

a nitrification vessel which connects to a first portion of said two portions, in which ammonia contained in wastewater distributed to the first portion is nitrified by ammonium oxidizing bacteria;

a denitrification vessel which connects to a second portion of said two portions, in which wastewater distributed to the second portion is denitrified by denitrification bacteria;

an anaerobic ammonium oxidation vessel, in which mixed water of first treated water from the nitrification vessel and second treated water from the denitrification vessel is subjected to anaerobic ammonium oxidation by anaerobic ammonium oxidizing bacteria; and a returning line which feeds back a third treated water from the anaerobic ammonium oxidation vessel to the denitrification vessel for denitrification and BOD decomposition.

The ammonium wastewater used herein and also hereinafter refers to wastewater containing primarily ammonium as a nitrogen component.

According to the present invention, the ammonium wastewater containing a BOD component is distributed into two portions at a predetermined distribution ratio by the distributor. Almost the total amount of ammonium contained in one of the distributed wastewater portions is nitrified in the nitrification vessel for nitrite nitrogen to obtain a first treated water. On the other hand, the other distributed wastewater portion is denitrified by denitrification bacteria in the denitrification vessel to obtain a second treated water. The second treated water is mixed with the first treated water, and the mixed water is fed to the anaerobic ammonium oxidation vessel. The ratio of ammonium nitrogen to nitrite nitrogen of the mixed water can be easily adjusted by controlling the distribution ratio of the wastewater in this manner. Therefore, unlike a conventional method in which a nitrification ratio is controlled in the nitrification vessel, the ratio of ammonium nitrogen to nitrite nitrogen can be accurately controlled to be suitable for anaerobic ammonium oxidation method. Accordingly, all one has to do is previously setting a predetermined distribution ratio by the distributor so as to give a ratio of ammonium nitrogen to nitrite nitrogen suitable for the anaerobic ammonium oxidation.

Into the denitrification vessel, a BOD component contained in the other portion of the wastewater distributed by the distributor is fed on the one hand, and nitrate contained in the third treated water is fed, on the other hand, through a returning line from the anaerobic ammonium oxidation vessel. Hence, in the denitrification vessel, denitrification bacteria mediate a denitrification reaction by using the BOD component as a hydrogen donor. As a result, the BOD component of the second treated water fed into the anaerobic ammonium oxidation vessel and nitrate contained in the third treated water are decreased in amount at the same time.

Note that, since the BOD component is also removed by aerobic oxidation in the nitrification vessel, the BOD component of the first treated water has been decreased.

Furthermore, the first treated water contains dissolved oxygen (hereinafter referred to as "DO") since aerobic oxidation is performed in the nitrification vessel while aerating oxygen (air). The DO is diluted by mixing the second treated water containing no DO fed from the denitrification vessel with the first treated water. In this manner, since the mixed water containing a low DO component and a low BOD component can be sent to the anaerobic ammonium oxidation vessel, the performance of treatment carried out in the anaerobic ammonium oxidation vessel can be improved.

Hence, the present invention can solve the first to third problems at the same time and improve the performance of the anaerobic ammonium oxidation. In addition, since the structure of the apparatus is systematically constituted, enlargement of the apparatus can be avoided. The present invention is particularly effective when the concentration of a BOD component in the wastewater is 40 mg/L or more.

According to a third aspect of the present invention, the apparatus according to the second aspect further comprises: a BOD oxidation vessel between the distributor and the nitrification vessel. With the structure, it is possible to prevent nitrification performance from decreasing due to inhibition by a BOD component in the nitrification vessel. In addition, since the content of the BOD component in the first treated water further decreases, the amount of the BOD component flowing into the anaerobic ammonium oxidation vessel can be further decreased. In particular, the present invention is effective when the concentration of the BOD component is 100 mg/L or more.

According to a fourth aspect of the present invention, the apparatus according to one of aspects 2 and 3 further comprises: a mixing device which mixes the first treated water and the second treated water and is provided upstream of the anaerobic ammonium oxidation vessel. The presence of the mixing device, which mixes the first treated water and the second treated water, upstream of the anaerobic ammonium oxidation vessel can prevent a high concentrated nitrite from flowing into the anaerobic ammonium oxidation vessel. This is because when the nitrite nitrogen concentration exceeds 200 mg/L, the activity of the anaerobic ammonium oxidizing bacteria is inhibited, thereby deteriorating the nitrogen removal performance. Hence, the nitrite nitrogen concentration of the mixed water is preferably 200 mg/L or less.

According to a fifth aspect of the present invention, the apparatus according to any one of aspects 2 to 4 further comprises: a feedback line which feeds back the third treated water to an inlet of the anaerobic ammonium oxidation vessel. By feeding back the third treated water with a decreased nitrite nitrogen concentration due to the treatment performed in the anaerobic ammonium oxidation vessel, to the inlet of the anaerobic ammonium oxidation vessel in this manner, the nitrite nitrogen concentration of the mixed water can be decreased. In this way, the nitrite nitrogen concentration of the mixed water can be controlled not to increase excessively.

As described in the above, according to the method and apparatus of removing nitrogen of the present invention, it is possible to solve the problems related to control of ammonium ($NH_4$) nitrogen-to-nitrite ($NO_2$) nitrogen ratio, inhibition of the anaerobic ammonium oxidation by a BOD component, and nitrite remaining in the treated water treated by the anaerobic ammonium oxidation, as well as improve the performance of the anaerobic ammonium oxidation. Furthermore, enlargement of the apparatus is avoided.

DETAILED DESCRIPTION OF THE PREFERRED EMBODIMENTS

Preferred embodiments of a method and apparatus of removing nitrogen according to the present invention will be described below by way of the accompanying drawings.

Figure 1:
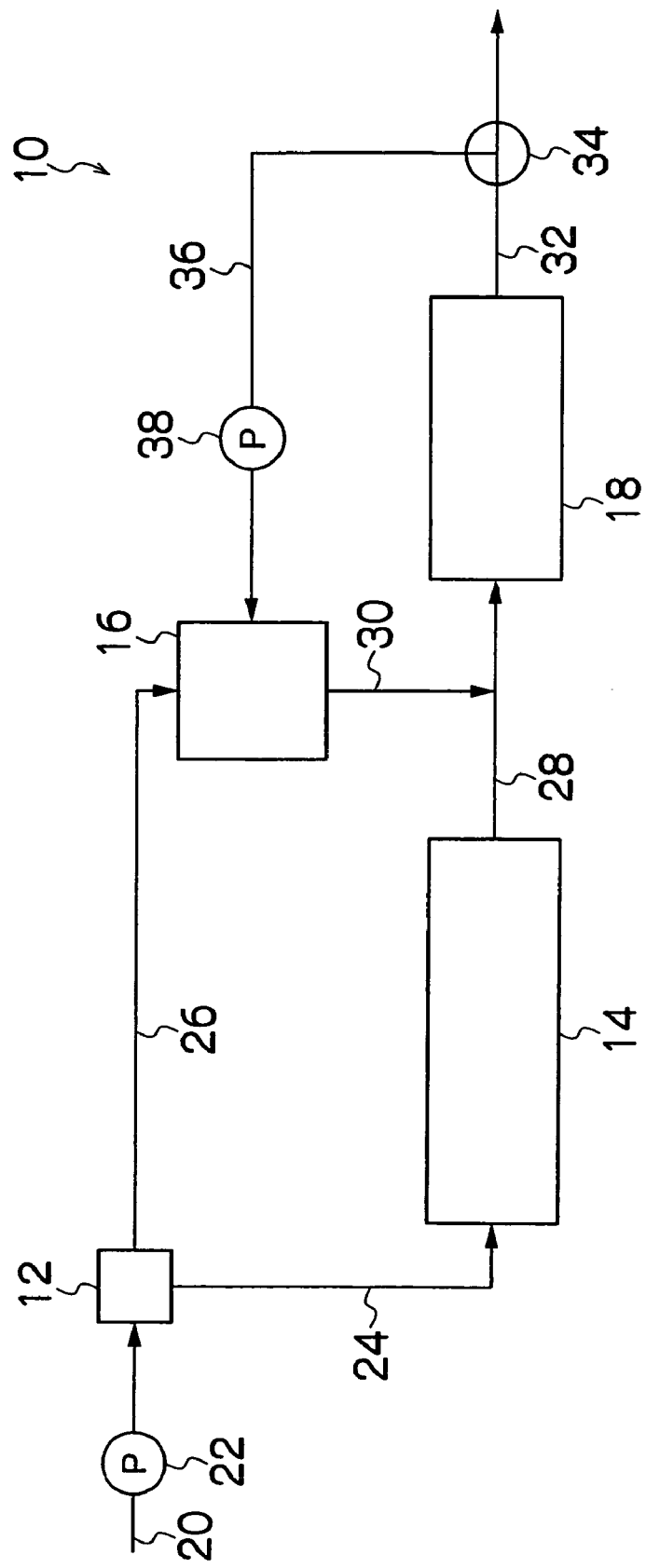
FIG. 1 is a conceptual view showing the entire structure of a nitrogen removing apparatus according to the present invention.

FIG. 1 is a conceptual view for use in explaining the entire structure of an apparatus of removing nitrogen according to the present invention.

As is shown in FIG. 1, a nitrogen removing apparatus 10 of the present invention is primarily constituted of a distributor 12, a nitrification vessel 14 for nitrite nitrogen, a denitrification vessel 16, and an anaerobic ammonium oxidation vessel 18, which are systematically connected by a pipe so as not to increase the size of the apparatus 10.

The ammonium wastewater flowing through a raw water pipe 20 is fed to the distributor 12 by a raw water pump 22 and distributed by the distributor 12 at a predetermined distribution ratio (the raw water pump 22 is not always required). One portion of the wastewater thus distributed is fed to the nitrification vessel 14 for nitrite nitrogen by way of a first pipe 24, whereas the other portion of the wastewater is fed to the denitrification vessel 16 by way of a second pipe 26. A first treated water obtained in the nitrification vessel 14 is fed to the anaerobic ammonium oxidation vessel 18 by way of a third pipe 28; at the same time a second treated water treated in the denitrification vessel 16 is fed through a fourth pipe 30 and mixed to the middle of the third pipe 28. A third treated water obtained in the anaerobic ammonium oxidation vessel 18 is partly discharged outside the system by way of a treated water pipe 32. The remaining part of the third treated water is branched by a flow divider 34 provided in the middle of the treated water pipe 32 and fed back to the denitrification vessel 16 by way of a fifth pipe 36 for denitrification and BOD decomposition. A returning pump 38 is provided on the fifth pipe 36. The treated water pipe 32, flow divider 34, fifth pipe 36, and the returning pump 38 constitute a returning line.

The predetermined distribution ratio by the distributor 12 is preferably controlled such that the molar ratio of ammonium nitrogen to nitrite nitrogen at the inlet of the anaerobic ammonium oxidation vessel 18 falls in the proximity of 1:1.3. Provided that the flow amount of the first pipe 24 is defined as A, the flow amount of the second pipe 26 is defined as B, the distribution ratio can be expressed by A/(A+B). The distribution ratio, A/(A+B), preferably falls within the range of 50 to 75%, more preferably within the range of 55 to 70%.

To the nitrification vessel 14 for nitrite nitrogen, one portion of the wastewater distributed by the distributor 12 is fed through the first pipe 24 and ammonium contained in the wastewater is oxidized by ammonium oxidation bacteria to nitrite in its entirety. The nitrification vessel 14 is preferably packed with carriers or attaching media having the ammonium oxidizing bacteria immobilized thereto. The ammonium oxidizing bacteria to be immobilized may be those separated from sludge or the like, or activated sludge containing microbial community where ammonium oxidizing bacteria are preferentially proliferated. In this case, the immobilization carrier may be either an entrapping immobilization carrier having ammonium oxidizing bacteria entrapped therein or an adhesion immobilization carrier having the bacteria adhered on the surface.

As a material for such an immobilization carrier, use may be made, but not limited to, a gel of polyvinyl alcohol, alginic acid, or polyethylene glycol; or plastic made of cellulose, polyester, polypropylene, or vinyl chloride. As the immobilization carrier, a formed product having a spherical, cylindrical, or cubic shape; or a porous, honeycomb, or spongy form can be preferably used. As the attaching media, a media formed of vinyl chloride or polyethylene may be preferably used. Furthermore, the present invention is applicable to granules taking advantages of auto granulation of microbes.

To manufacture an entrapping immobilization carrier for nitrite nitrogen, use may be made of a method, which comprises the step of immobilizing a microbe sludge containing many types of bacteria including ammonium oxidizing bacteria and nitrite oxidizing bacteria within a carrier by entrapping, and heating the entrapping immobilization carrier, thereby inactivating nitrite oxidizing bacteria contained in the microbe sludge. In this case, heating treatment is performed at a temperature preferably within the range of 50 to 90° C., and more preferably, 60 to 80° C. for a time preferably within the range of 20 minutes to one week, and more preferably, 20 minutes to 24 hours. As a method of suppressing nitrite oxidation activity of an immobilization carrier and activated sludge placed in the nitrification vessel 14, use is made of a method of controlling dissolved oxygen (DO) of the nitrification vessel 14 within 2.0 mg/L or less, and a method of giving an ammonium load as high as 1.0 kg-N/m³ per day to the nitrification vessel 14, but not limited to these.

The packing ratio of the nitrification vessel 14 with immobilized carriers is preferably from 5 to 40% by volume, and more preferably, from 8 to 20% by volume. The packing ratio of the nitrification vessel 14 with attaching media is preferably from 30 to 80% in terms of apparent volume, and more preferably, 40 to 70%. The packing ratio with granules is preferably from 20 to 80% by volume, and more preferably, 30 to 60%.

To the denitrification vessel 16, wastewater containing ammonium and a BOD component is fed through the second pipe 26; at the same time, the third treated water containing nitrate is fed through the returning line from the anaerobic ammonium oxidation vessel 18. When the wastewater and the third treated water are mixed in the denitrification vessel 16, the reaction for converting nitrate to nitrogen gas is mediated by denitrification bacteria in the denitrification vessel 16, by use of the BOD component as a hydrogen donor. In this manner, not only the BOD component in the wastewater but also nitrate remaining after the treatment in the anaerobic ammonium oxidation vessel 18, can be treated simultaneously in the denitrification vessel 16. If necessary, an organic hydrogen donor such as methanol may be added in the denitrification vessel 16. However, the treatment for reducing the content of the BOD component in the wastewater should be prioritized in the denitrification vessel 16. The concentration of the BOD component in the second treated water fed from the denitrification vessel 16 is reduced preferably to 60 mg/L or less, and more preferably, 40 mg/L or less.

It is preferable to also pack the denitrification vessel 16 with immobilization carriers or attaching media in the same manner as in the nitrification vessel 14. Note that in the case of the denitrification vessel 16, denitrification bacteria are immobilized to the immobilization carriers or attaching media. The denitrification bacteria to be immobilized may be separated from microbes of activated sludge or the like or activated sludge containing microbial community where denitrification bacteria are preferentially proliferated. Note that the material and shape of the immobilization carrier, the material for the attaching media, and packing ratio of the denitrification vessel 16 with the immobilized carrier or attaching media are the same as described in the case of nitrification vessel 14 and thus omitted herein. A load of nitrogen based on the sum (NOx-N) of nitrite nitrogen (NO2-N) and nitrate nitrogen (NO3-N) is not particularly restricted; however, preferably falls within the range of 0.1 to 0.8 kg-N/m3/day, and more preferably, 0.2 to 0.6 kg-N/m3/day.

Mixed water of the first treated water from the nitrification vessel 14 with the second treated water from the denitrification vessel 16 flows into the anaerobic ammonium oxidation vessel 18, and then anaerobic ammonium oxidation bacteria contained in the anaerobic ammonium oxidation vessel 18 denitrify ammonium and nitrite contained in the mixed water, simultaneously. At this time, nitrate is produced in an amount of 0.26 moles per mole of ammonia. In the present invention, it is important to feed mixed water of the first treated water with the second treated water into the anaerobic ammonium oxidation vessel 18 and the first treated water should not be fed into the denitrification vessel 16. This is because if the first treated water is fed into the denitrification vessel 16, nitrite produced in the nitrification vessel 14 is denitrified by the BOD component contained in the wastewater, and thus a reduced amount of nitrite is supplied to the anaerobic ammonium oxidation vessel 18 in the downstream, with the result that nitrite required by the reaction performed in the anaerobic ammonium oxidation vessel 18 is not sufficiently provided. As a result, the concentration of ammonium nitrogen in the third treated water fed from the anaerobic ammonium oxidation vessel 18 increases, significantly decreasing the nitrogen removal rate.

Although it is not known much about anaerobic ammonium oxidizing bacteria, it is said that the bacteria may be represented by Planctomycete. It has been reported that the proliferation rate of the anaerobic ammonium oxidation bacteria is as considerably low as 0.001 h-1(see, for example, Strous M. et al., Nature 400, 446 (1999)). The anaerobic ammonium oxidation vessel 18 is preferably packed with the immobilization pallets or attaching media having the anaerobic ammonium oxidizing bacteria immobilized thereto. Note that the anaerobic ammonium oxidizing bacteria to be immobilized may be obtained by enrichment culture from microbes of activated sludge or the like or may be an activated sludge containing anaerobic ammonium oxidizing bacteria. The material and shape of the immobilization carrier are the same as those explained in the case of the nitrification vessel 14 and thus the explanation is omitted herein. Furthermore, the immobilization method used herein is not particularly limited, and for example, use may be made of a method of adhering bacteria onto an adhesion immobilization material such as nonwoven cloth and plastic, a method of entrapping bacteria within a gel, a method of forming a biological film on a plastic pallet and immobilizing bacteria in the membrane, and a method of using bacteria as a granule. The packing ratio with the immobilization pallet is preferably 10 to 40% by volume and more preferably, 15 to 30% by volume. The packing ratio with nonwoven cloth is preferably 40 to 90% in terms of apparent packing ratio, and more preferably, 50 to 80%. The packing ratio with attaching media is preferably 30 to 80% in terms of apparent volume, and more preferably, 40 to 70%. The packing ratio with granules is preferably 20 to 80% by volume, and more preferably, 30 to 60%.

Figure 2:
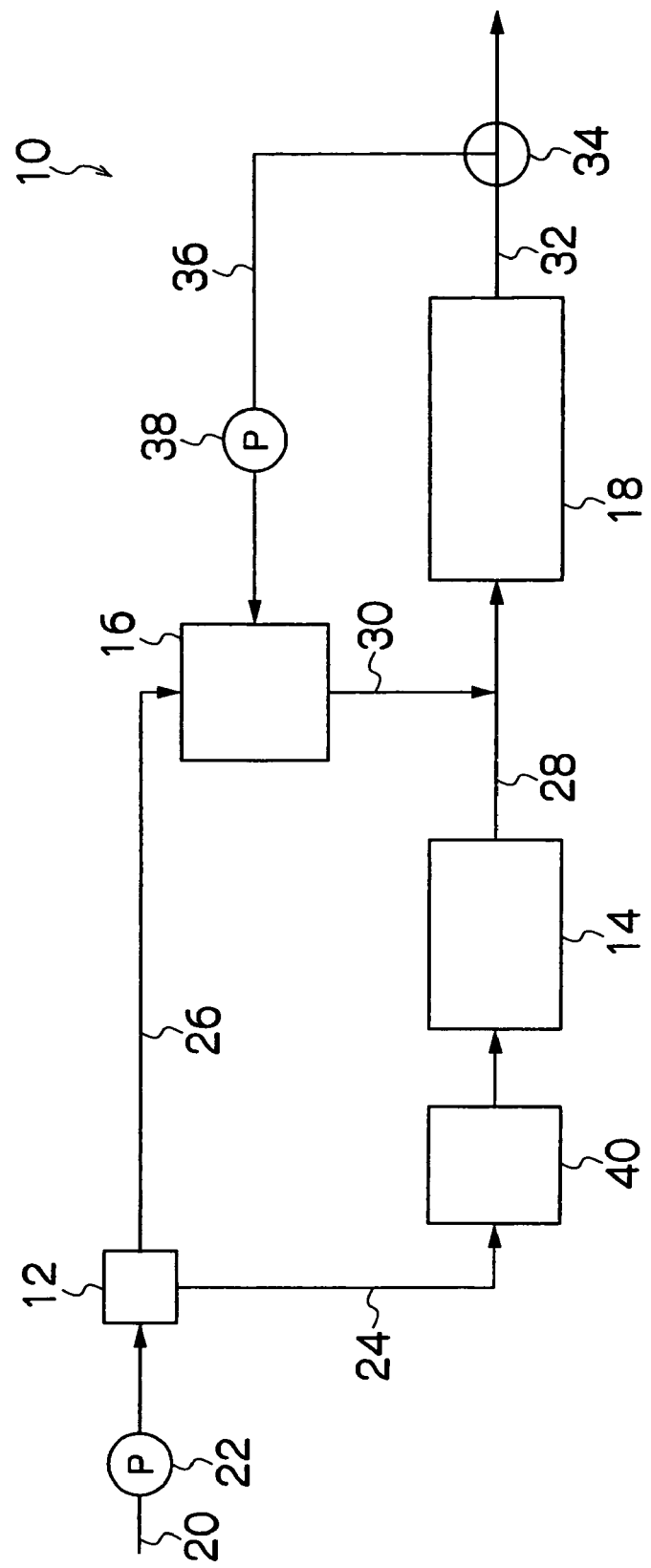
FIG. 2 is a conceptual view of the nitrogen removing apparatus shown in FIG. 1, further having a BOD oxidation vessel in a first pipe connecting between a distributor and a nitration vessel.

In the nitrogen removing apparatus 10 shown in FIG. 2, a BOD oxidation vessel 40 is further provided on the way of the first pipe 24 connecting between the distributor 12 and the nitrification vessel 14 of the nitrogen removing apparatus 10 shown in FIG. 1. Note that like reference numerals are used to designate like apparatus and structural elements corresponding to those in FIG. 1 and any further explanation is omitted for brevity's sake.

As described, the presence of the BOD oxidation vessel 40 arranged in the middle of the first pipe 24 connecting between the distributor 12 and the nitrification vessel 14 can prevent the activity of ammonium oxidizing bacteria from reducing by the supply of the BOD component into the nitrification vessel 14. By virtue of this, the conversion rate from ammonium to nitrite can be increased, so that ammonium contained in one portion of the wastewater distributed by the distributor 12 can be oxidized into nitrite in its entirety. Not that the BOD oxidation vessel 40 is preferably provided downstream of the distributor 12. This is because, in some cases, part of ammonium is nitrified simultaneously with oxidation of the BOD component to produce nitrite and nitrate, with the result that the component ratio of nitrogen in ammonium, nitrite and nitrate present in the wastewater changes, making it difficult for the distributor 12 to control the ratio of ammonium to nitrite, accurately. The BOD oxidation vessel 40 is preferably equipped with a device for immobilizing microbe by adhesion, similarly to the case of the anaerobic ammonium oxidation vessel 18. Examples of the immobilization method suitably include, but not particularly limited, a method of attaching bacteria onto a media such as nonwoven cloth and plastic, a method of entrapping bacteria within a gel, and a method of forming a biological film on a plastic carrier and immobilizing bacteria in the membrane. Note that the packing ratio of the immobilization pallet, nonwoven cloth, and attaching media are the same as in the case of the anaerobic ammonium oxidation vessel 18.

Figure 3:
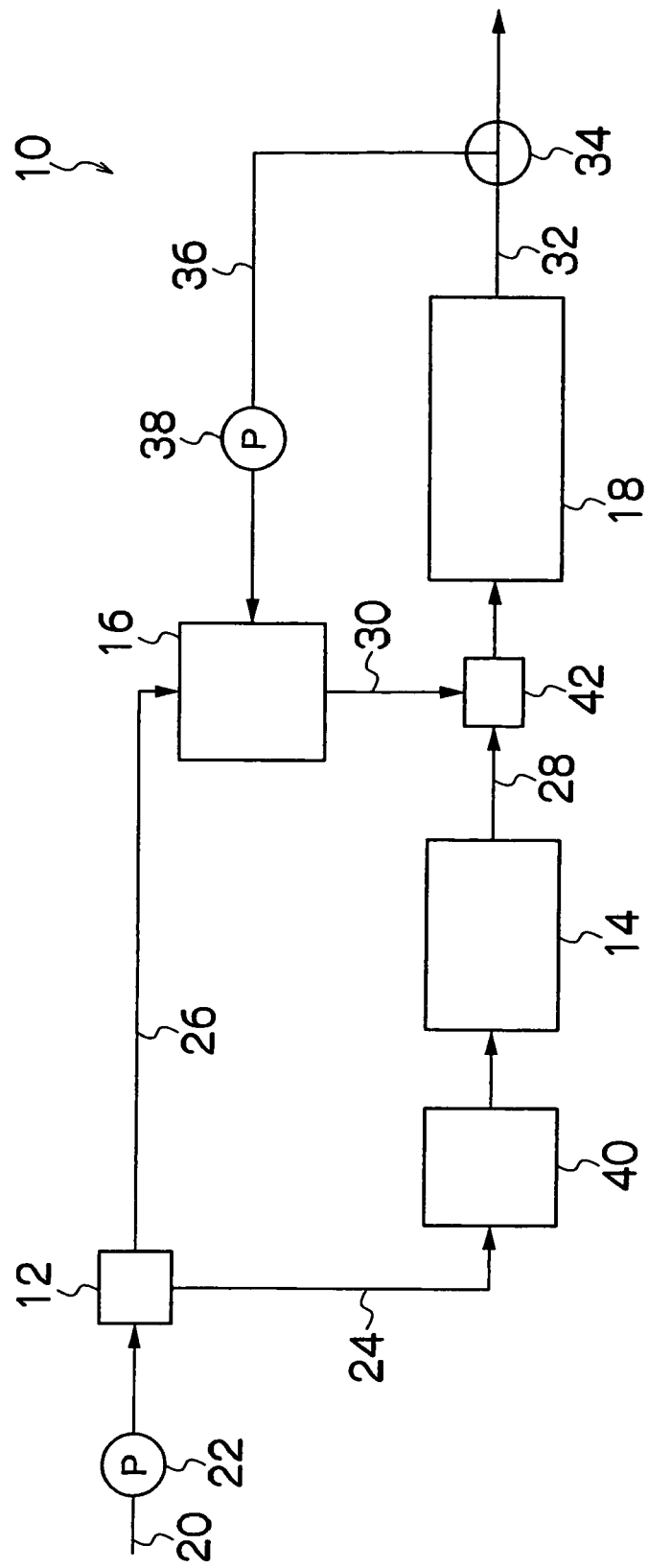
FIG. 3 is a conceptual view of the nitrogen removing apparatus shown in FIG. 2, further having a mixing device at a mixing point of a third pipe with a fourth pipe.

In the nitrogen removing apparatus 10 shown in FIG. 3, a mixing device 42 is provided at the position at which the third pipe 28 and the fourth pipe 30 are merged in the nitrogen removing apparatus 10 shown in FIG. 2. Note that like reference numerals are used to designate like apparatus and structural elements corresponding to those in FIGS. 1 and 2 and any further explanation is omitted for brevity's sake.

As the mixing device 42, a mixing vessel equipped with a stirrer and a line mixer can be suitably used. It is necessary to prevent oxygen (air) from dissolving during a mixing operation. Therefore, the mixing operation is preferably performed within an airtight chamber or performed with stirring under aeration of a low-oxygen gas. The presence of the mixing device 42 provided at the merging point of the third pipe 28 with the fourth pipe 30 enables to mix the first treated water containing nitrite with the second treated water containing ammonium to obtain nitrite at a uniform concentration. As a result, it is possible to prevent high concentration nitrite from directly flowing into the anaerobic ammonium oxidation vessel 18. This is because if the high concentration nitrite flows directly into the anaerobic ammonium oxidation vessel 18, the concentration of nitrite nitrogen locally increases within the anaerobic ammonium oxidation vessel 18, with the result that the activity of anaerobic ammonium oxidation bacteria responsible for the anaerobic ammonium oxidation reaction may sometimes decrease or be inactivated. In particular, the mixing device 42 is required when the concentration of nitrite nitrogen in the first treated water fed from the nitrification vessel 14 exceeds 310 mg/L; and the mixing device 42 is preferably provided when the concentration exceeds 200 mg/L.

Figure 4:
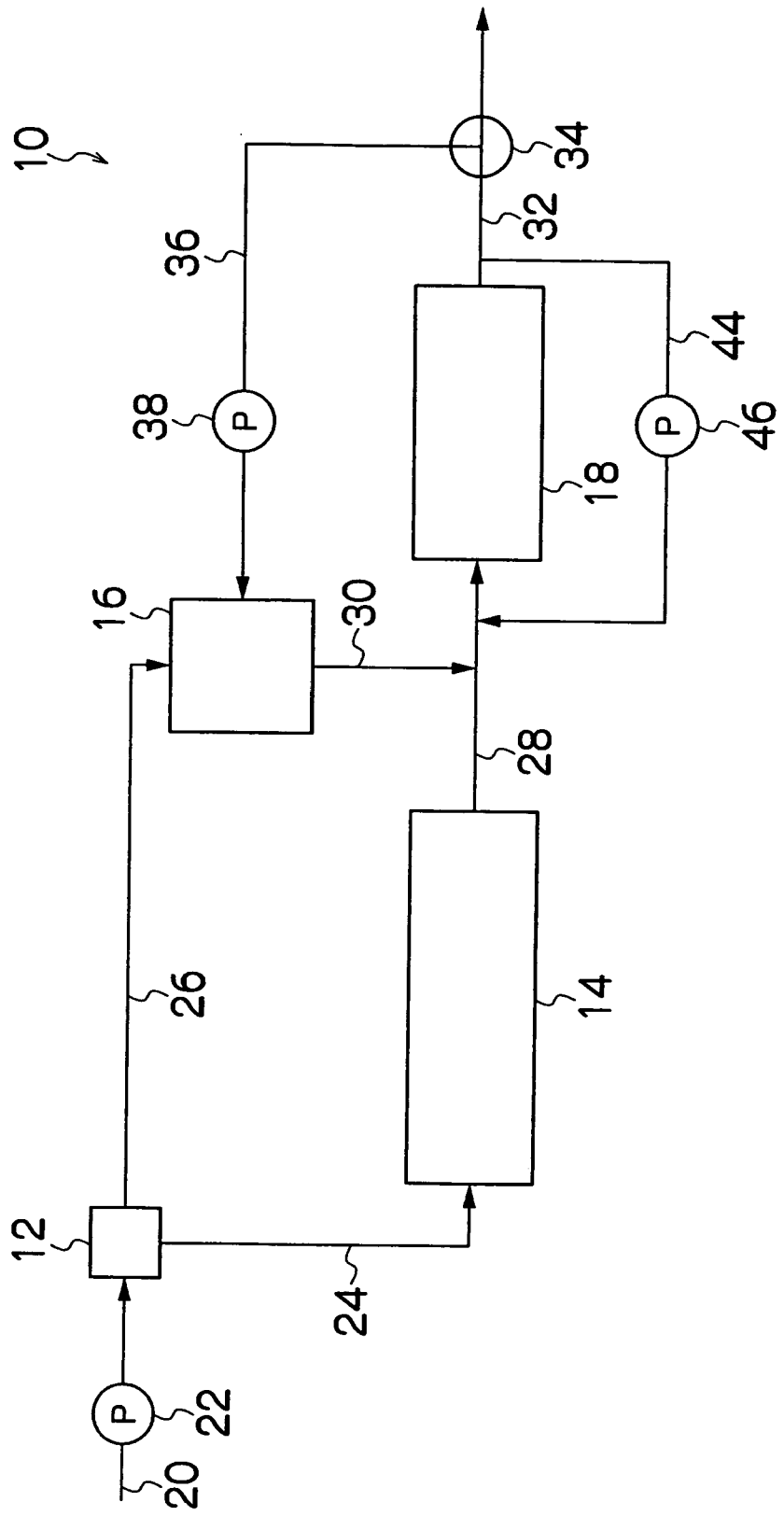
FIG. 4 is a conceptual view of the nitrogen removing apparatus shown in FIG. 1, further having a feedback line for feeding back a third treated water to the inlet of the anaerobic ammonium oxidation vessel.

In the nitrogen removing apparatus shown in FIG. 4, a feedback pipe 44 for feeding the third treated water back to the inlet of the anaerobic ammonium oxidation vessel 18 is provided and simultaneously a feedback pump 46 is provided in the feedback pipe 44 in the nitrogen removing apparatus 10 shown in FIG. 1. In this case, the feedback pipe 44 and the feedback pump 46 constitute a feedback line. Note that like reference numerals are used to designate like apparatus and structural elements corresponding to those in FIGS. 1, 2 and 3 and any further explanation is omitted for brevity's sake.

As mentioned above, the presence of the feedback line for feeding back the third treated water to the inlet of the anaerobic ammonium oxidation vessel 18 feeds back the third treated water, which has been treated in the anaerobic ammonium oxidation vessel 18 and reduced in concentration of nitrite nitrogen, to the inlet of the anaerobic ammonium oxidation vessel 18, with the result that the concentration of nitrite nitrogen of the mixed water can be reduced. In particular, when the concentration of nitrite nitrogen of the first treated water exceeds 200 mg/L, the feedback line is preferably provided. When the concentration of nitrite nitrogen exceeds 310 mg/L, both the mixing device 42 and the feedback line are preferably used.

Note that in FIGS. 1 to 4, a basic structure is formed of the distributor 12, nitrification vessel 14, denitrification vessel 16, anaerobic ammonium oxidation vessel 18 and recycling line (FIG. 1). In addition to the basic structure, the BOD oxidation vessel 40 is provided in the case of FIG. 2; the BOD oxidation vessel 40 and the mixing device 42 are provided in the case of FIG. 3; and the feedback line is provided in the case of FIG. 4. However, all of the BOD oxidation vessel 40, mixing device 42 and feedback line may be provided.

EXAMPLES

Now, examples of the present invention will be explained; however, the present invention should not be limited to these examples.

Example 1

A test wastewater treatment was performed by use of nitrogen removing apparatus 10 according to the present invention shown in FIG. 1.

(Wastewater Subjected to Test)

As the wastewater subjected to test, a diluted solution of digested sewage sludge decomposition liquid was used after its ammonium nitrogen concentration ($NH_4$—N) was adjusted to 300 mg/L by adding ammonium sulfate as a $NH_4$—N source. The wastewater thus adjusted had a BOD component concentration of 18 mg/L, and a nitrite ($NO_2$) concentration and a nitrate ($NO_3$) concentration both were 5 mg/L or less.

(Treatment Conditions)

The distribution ratio by the distributor 12: The first pipe 24 to the second pipe 26=65:35.

The volume load of each of the vessels 14, 16, and 18 was determined based on wastewater concentration ($NH_4$—N)=300 mg/L. The volume load of nitrification vessel 14 was set at 0.6 kg-N/m³/day. Furthermore, the nitrification vessel 14 was packed with entrapping immobilization pallets, which were previously heated at 60° C. for one hour, so as to attain a packing ratio of 15% by volume.

The nitrogen load of the denitrification vessel 16 based on the sum (NOx-N) of nitrite nitrogen (NO2-N) and nitrate nitrogen (NO3-N) was set at 0.3 kg-N/m3/day. The denitrification vessel 16 was packed with attaching media made of vinyl chloride so as to attain an apparent packing ratio of 60%. The attaching media for bacteria had a porosity of 98% or more.

The nitrogen load of the anaerobic ammonium oxidation vessel 18 was set at 3.0 kg-N/m3/day. Furthermore, the anaerobic ammonium oxidation vessel 18 was packed with nonwoven cloth (biofilm carrier) having anaerobic ammonium oxidation bacteria adhered thereto so as to attain an apparent packing ratio of 80%. The nonwoven cloth was woven having an opening diameter of 510 mm in the form of chrysanthemum and had a porosity of 99% or more.

The flow mount of the third treated water to be fed back to the denitrification vessel 16 for returning was equal to that of the wastewater (raw water) supplied from the raw water pipe 20.

Operation for test was performed after acclimatization operation was performed for about 2 months and confirmed that the quality of final treated water discharged from the treated water pipe 32 became stable. The test operation was performed for 2 months to obtain experimental data.

Comparative Example 1

Operation was performed in substantially the same conditions as in Example 1 except that the denitrification vessel 16 was not provided in the nitrogen removing apparatus of Example 1.

The quality of final treated waters of Example 1 and Comparative Example 1 are shown in Table 1. The value within parentheses is an average.

TABLE 1

| | $NH_4$—N (mg/L) | $NO_3$—N (mg/L) | $NO_2$—N (mg/L) |
|---|---|---|---|
| Example 1 | 20–26 (24) | 31–38 (35) | 5 or less |
| Comparative Example 1 | 41–58 (48) | 57–67 (61) | 5 or less |

As is apparent from Table 1, the ammonium nitrogen concentration remaining in the final treated water of Example 1 was about a half of that of Comparative Example 1. Therefore, the nitrogen removal rate was improved by the anaerobic ammonium oxidation vessel 18. Although the conditions in the nitrification vessel 14 arranged upstream of the anaerobic ammonium oxidation vessel 18 were the same between Examples 1 and Comparative Example 1, the reaction rate in the anaerobic ammonium oxidation vessel 18 decreased. From this, it is considered that the concentration of a BOD component, which varies depending upon the presence or absence of the denitrification vessel 16, and is fed in the anaerobic ammonium oxidation vessel 18, may affect the reaction rate in the anaerobic ammonium oxidation vessel 18.

Example 2

A test wastewater treatment was performed by use of nitrogen removing apparatus 10 according to the present invention shown in FIG. 2.

(Wastewater Subjected to Test) p As the wastewater subjected to test, a diluted solution of digested sewage sludge decomposition liquid was used after its ammonium nitrogen concentration ($NH_4$—N) and BOD component concentration were adjusted respectively to 300 mg/L by adding ammonium sulfate as a $NH_4$—N source, and 200 mg/L by adding sodium acetate as a BOD component source. Note that nitrite ($NO_2$) concentration and nitrate ($NO_3$) concentration of the wastewater thus adjusted were 5 mg/L or less.

(Treatment Conditions)
  The distribution ratio by the distributor 12: The first pipe 24 to the second pipe 26=65:35.
  The volume load of each of the vessels 14, 16, and 18 was determined based on wastewater concentration ($NH_4$—N)=300 mg/L. The volume load of nitrification vessel 14 was set at 0.6 kg-N/m³ per day. Furthermore, the nitrification vessel 14 was packed with entrapping immobilization pallets, which were previously heated at 60° C. for one hour, so as to attain a packing ratio of 15% by volume.
  The nitrogen load of the denitrification vessel 16 based on the sum ($NO_x$—N) of nitrite nitrogen ($NO_2$—N) and nitrate nitrogen ($NO_3$—N) was set at 0.3 kg-N/m³ per day. The denitrification vessel 16 was packed with attached carriers made of polypropylene so as to attain an apparent packing ratio of 10%.
  The nitrogen load of the anaerobic ammonium oxidation vessel 18 was set at 3.0 kg-N/m³/day. Furthermore, the anaerobic ammonium oxidation vessel 18 was packed with nonwoven cloth having anaerobic ammonium oxidation bacteria adhered thereto so as to attain an apparent packing ratio of 80%. The nonwoven cloth was woven out of hollow fiber having an opening diameter of 510 μm in the form of chrysanthemum and had a porosity of 99% or more.
  The flow amount of the third treated water to be fed back to the denitrification vessel 16 for returning was equal to that of the wastewater (raw water) supplied from the raw water pipe 20.
  Operation for test was performed after acclimatizing operation was performed for about 3 months and confirmed that the quality of final treated water discharged from the treated water pipe 32 became stable. The test operation was performed for 2 months to obtain experimental data.

Comparative Example 2

Operation was performed in substantially the same conditions as in Example 2 except that the denitrification vessel 16 and the BOD oxidation vessel 40 were not provided in the nitrogen removing apparatus of Example 2.

The quality of final treated water of Example 2 and Comparative Example 2 are shown in Table 2. The value within parentheses is an average.

TABLE 2

|  | $NH_4$—N (mg/L) | $NO_3$—N (mg/L) | $NO_2$—N (mg/L) |
|---|---|---|---|
| Example 2 | 24–31 (27) | 18–23 (21) | 5 or less |
| Comparative Example 2 | Operation was stopped by a rapid decrease of nitrogen removal rate. Ammonium nitrogen is more than 100 mg/l. | | |

As is apparent from Table 2, although the wastewater of Example 2 had a BOD component concentration 10 or more times as large as that of Example 1, the concentration of ammonium nitrogen remaining in the final treated water was reduced to the level of Example 1. Furthermore, the concentration of nitrate remaining in the final treated water was lower than the level of Example 1. This suggests that when the wastewater having a high BOD component concentration is treated by the nitrogen removing apparatus 10 constructed as shown in Example 2, the level of the remaining nitrate of the final treated water can be reduced and inhibition by the BOD component can be prevented in the anaerobic ammonium oxidation vessel 18. The nitrogen removal rate in the anaerobic ammonium oxidation vessel 18 was about 2.7 kg-N/m³/day.

On the other hand, in Comparative Example 2, the nitrogen removal performance of the anaerobic ammonium oxidation vessel 18 reduced. Since the nitrogen removal rate in the anaerobic ammonium oxidation vessel 18 decreased to 0.2 kg-N/m³/day 2 weeks after initiation of operation, the operation was stopped. This is considered that a BOD component introduced to the anaerobic ammonium oxidation vessel 18 may inhibit an anaerobic ammonium oxidation reaction.

Example 3

A test wastewater treatment was performed by use of nitrogen removing apparatus 10 according to the present invention shown in FIG. 4.

(Wastewater Subjected to Test)
  The same wastewater as used in Example 1 was used.

(Treatment Conditions)
  The distribution ratio by the distributor 12: The first pipe 24 to the second pipe 26=65:35.
  The volume load of each of the vessels 14, 16, and 18 was determined based on wastewater concentration ($NH_4$—N)=300 mg/L. The volume load of nitrification vessel 14 was set at 0.6 kg-N/m³/day. Furthermore, the nitrification vessel 14 was packed with entrapping immobilization pallets, which were previously heated at 60° C. for one hour, to a packing ratio of 15% by volume.
  The nitrogen load of the denitrification vessel 16 based on the sum ($NO_x$—N) of nitrite nitrogen ($NO_2$—N) and nitrate nitrogen ($NO_3$—N) was set at 0.2 kg-N/m³/day. The denitrification vessel 16 was packed with attaching media made of vinyl chloride so as to attain an apparent packing ratio of 55%.
  The anaerobic ammonium oxidation vessel 18 was packed with 3 mm-long hollow carriers made of polypropylene and attaching an anaerobic ammonium oxidation bacteria adhered thereto so as to attain an apparent packing ratio of 20%. The volume load was set at 3.0 kg-N/m$^3$/day.

The flow amount of the third treated water to be fed back to the denitrification vessel 16 for returning was equal to that of the wastewater (raw water) supplied from the raw water pipe 20.

Feedback pump 46 was controlled so as to feed back the treated water at a flow rate 1.5 times as high as that of the raw water.

The quality of the final treated waters discharged from the treated water pipe 32 where the feedback pump 46 was used (Example 3) and where the feedback pump 46 was not used (Comparative Example 3) is shown in Table 3. The value within parentheses is an average.

TABLE 3

|  | NH$_4$—N (mg/L) | NO$_3$—N (mg/L) | NO$_2$—N (mg/L) |
| --- | --- | --- | --- |
| Example 3 | 21–28 (24) | 30–37 (35) | 5 or less |
| Comparative Example 3 | 36–44 (40) | 26–34 (31) | 17–22 (18) |

As is confirmed from these results, the nitrogen removal performance decreased in Comparative Example 3 where the feedback pump 46 was not used. This is conceivably because anaerobic ammonium oxidation bacteria were not adhered sufficiently to the pallets posted in the anaerobic ammonium oxidation vessel 18, and nitrite was left in a concentration of about 12 mg/L in the water flowing through the treated water pipe 32. More specifically, it is considered that since the nitrite found in the treated water pipe 32 was fed back to the denitrification vessel 16 by the returning pump 38, a denitrification reaction takes place in the vessel 16. Therefore, the ratio of ammonium nitrogen to nitrite nitrogen in the anaerobic ammonium oxidation vessel 18 deviated from a proper value (causing shortage of NO$_2$), increasing the concentration of ammonium in the treated water.

In contrast, in the case where the feedback pump 46 was used, no NO$_2$ was detected in the water flowing through the pipe 36 and nitrite detected in the treated water pipe 32 was fed back in its entirety to the inlet of the anaerobic ammonium oxidation vessel 18. Therefore, since shortage of NO$_2$ is not confirmed at the inlet of the anaerobic ammonium oxidation vessel 18, there was no deviation of ammonium-to-nitrite ratio from the proper one. Hence, in Example 3, treated water was obtained with a good quality.

When the feedback pump 46 was used, the proper ratio of ammonium to nitrite could be maintained. Therefore, it was confirmed that the reaction efficiency within the anaerobic ammonium oxidation vessel 18 increases, with the result that the quality of treated water in the anaerobic ammonium oxidation vessel 18 and the entire system was improved.

What is claimed is:

1. An apparatus for removing nitrogen, in which the nitrogen is removed from wastewater containing a BOD component and ammonium nitrogen by anaerobic ammonium oxidation, comprising:
   a distributor, which distributes the wastewater into two portions;
   a nitrification vessel which connects to a first portion of said two portions, in which ammonia contained in wastewater distributed to the first portion is nitrified by ammonium oxidizing bacteria;
   a denitrification vessel which connects to a second portion of said two portions, in which wastewater distributed to the second portion is denitrified by denitrification bacteria;
   an anaerobic ammonium oxidation vessel, in which mixed water of first treated water from the nitrification vessel and second treated water from the denitrification vessel is subjected to anaerobic ammonium oxidation by ammonium oxidizing bacteria; and
   a returning line which feeds back a third treated water from the anaerobic ammonium oxidation vessel to the denitrification vessel for denitrification and BOD decomposition.

2. The apparatus for removing nitrogen according to claim 1, further comprising: a BOD oxidation vessel between the distributor and the nitrification vessel.

3. The apparatus for removing nitrogen according to claim 1, further comprising: a mixing device which mixes the first treated water and the second treated water and is provided upstream of the anaerobic ammonium oxidation vessel.

4. The apparatus for removing nitrogen according to claim 2, further comprising: a mixing device which mixes the first treated water and the second treated water and is provided upstream of the anaerobic ammonium oxidation vessel.

5. The apparatus for removing nitrogen according to claim 1, further comprising: a feedback line which feeds back the third treated water to an inlet of the anaerobic ammonium oxidation vessel.

6. The apparatus for removing nitrogen according to claim 2, further comprising: a feedback line which feeds back the third treated water to an inlet of the anaerobic ammonium oxidation vessel.

7. The apparatus for removing nitrogen according to claim 3, further comprising: a feedback line which feeds back the third treated water to an inlet of the anaerobic ammonium oxidation vessel.

8. The apparatus for removing nitrogen according to claim 4, further comprising: a feedback line which feeds back the third treated water to an inlet of the anaerobic ammonium oxidation vessel.

* * * * *